Oct. 16, 1962   L. M. JOLLS   3,058,285
MOWER ATTACHMENT
Filed Aug. 15, 1960   2 Sheets-Sheet 2
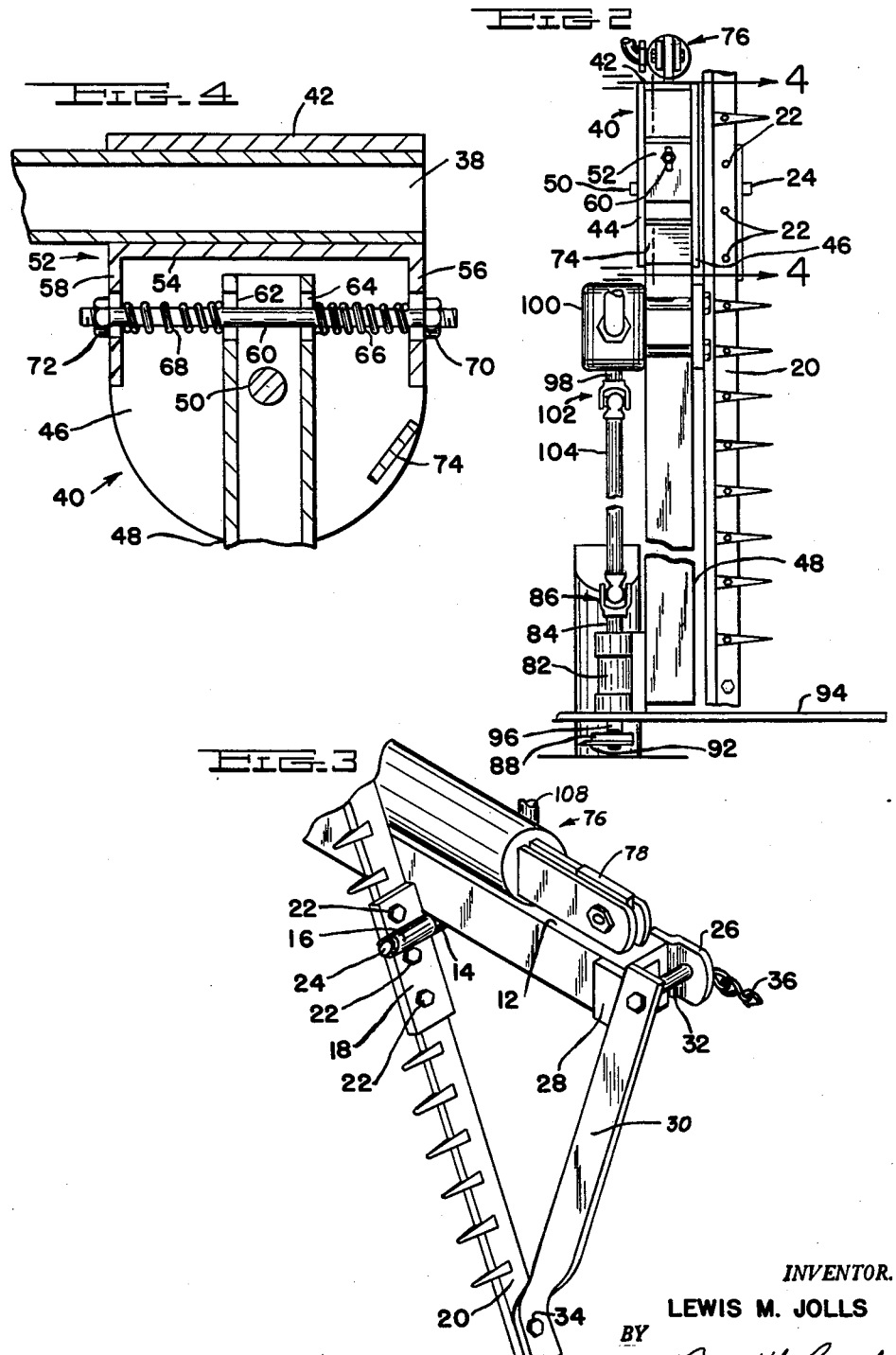
INVENTOR.
LEWIS M. JOLLS
BY
*Ross M. Campbell*
ATTORNEY United States Patent Office 3,058,285
Patented Oct. 16, 1962

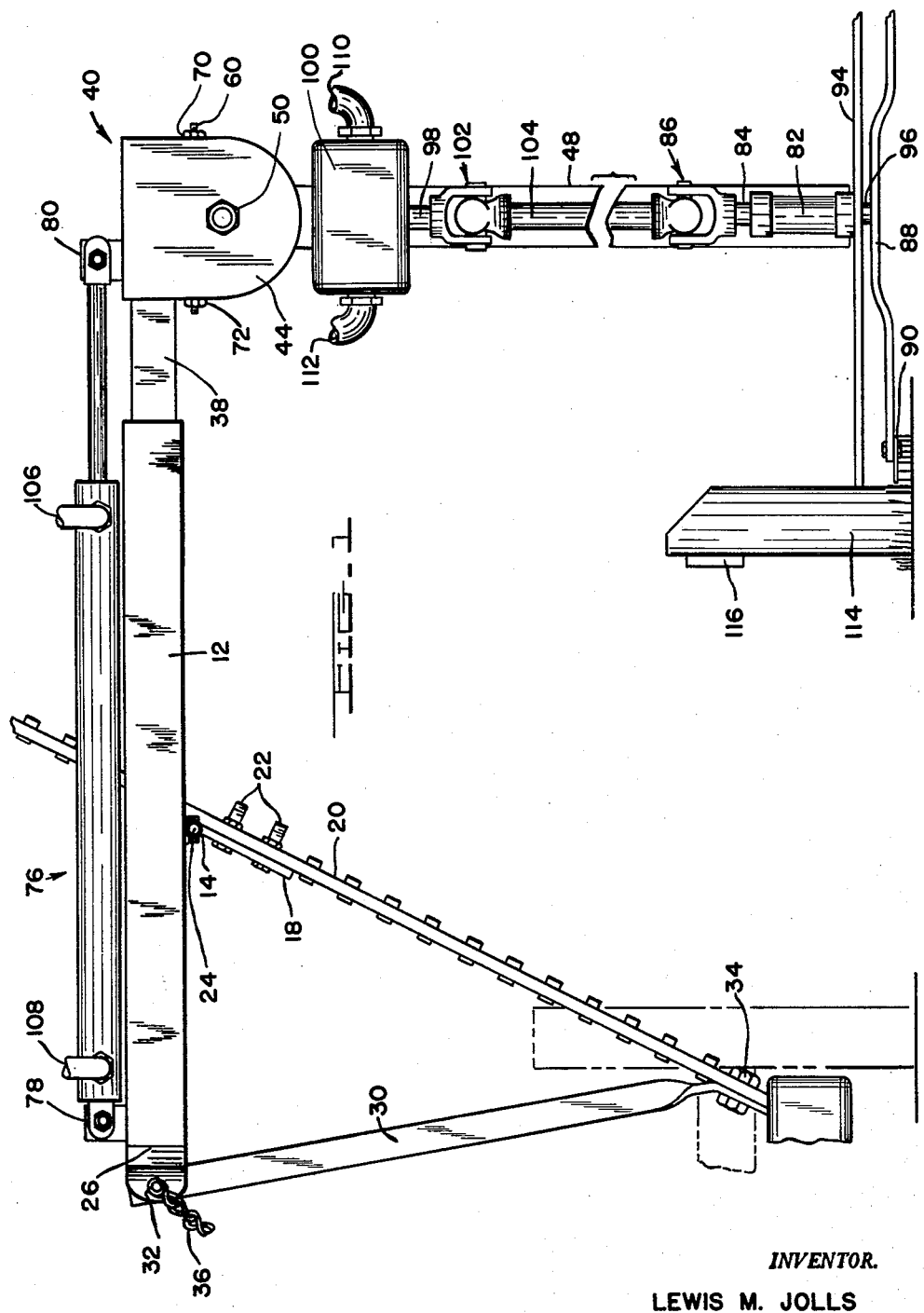

3,058,285
MOWER ATTACHMENT
Lewis M. Jolls, 602 Walnut St., Brighton, Mich.
Filed Aug. 15, 1960, Ser. No. 49,486
5 Claims. (Cl. 56—25.4)

This invention relates to a mower attachment for vehicles.

Heretofore, considerable difficulty has been experienced by highway maintenance departments, farmers, and others, in mowing grass and weeds growing beneath fences, such as highway guard fences and conventional rail fences.

The conventional, spaced fence posts which support the horizontal rails or wire strands of a fence prevent a conventional tractor mower or similar vehicle equipped with a cutter bar from cutting in a continuous operation, without zigzagging or backing and filling, the grass and weeds growing beneath such horizontal rails or wire strands.

Previous attempts to solve this problem frequently employed rotary cutting means pivotally attached to the tractor mower by pivot means the pivot axis of which was vertical. These devices, however, did not permit the mower operator to "back-cut," or cut grass and weeds growing on the reverse side of the fence, the stems of which might be out of reach of the mower attachment blade beneath the fence but the leaves of which might extend beneath the fence, at selected places along the fence without the necessity of driving the vehicle to and around the end of the fence and along the fence on the reverse side thereof. Often the configuration of the terrain on the reverse side of the fence—in the case of highway guard rails the side away from the road—was such as to prevent a tractor mower or similar vehicle from even operating thereon. In such cases it has heretofore, prior to my invention, been necessary to revert to the use of scythes or small power mowers operated by a dismounted man.

One embodiment of my invention includes a main arm pivotally connected to the cutter bar of a tractor mower having a raisable side cutter bar, support means for supporting said main arm upon said cutter bar, an extension arm slideably embraced by said main arm, power means for extending and retracting said extension arm with respect to said main arm, a vertical arm pivotally attached near its upper end to said extension arm, a rotary cutter bar and blades mounted on the lower end of said vertical arm for cutting grass and weeds, circular, independently rotatable guard means mounted on said vertical arm coaxially with said cutter bar and of greater diameter than said rotary cutter bar and blades, and power means to rotate said rotary cutter bar.

The primary object of my invention is to provide a novel and improved agricultural implement which when attached to a tractor or other vehicle is adapted to mow around fence posts and along fences, guard rails and like barriers, both on the side thereof nearest the vehicle and also on the side away from the vehicle. My invention is adapted to eliminate all hand trimming around fence posts and under and along fences, guard rails and similar barriers.

Another object of my invention is to provide a mower attachment for use in combination with a tractor having a raisable side cutter bar whereby the rotary cutter bar of said attachment may be raised above the top rail of a fence, extended beyond said rail, and lowered so as to cut grass and weeds on the reverse side of said fence.

Another object of my invention is to provide a mower attachment in which a rotating cutter bar is mounted on the lower end of a vertical arm which in turn is pivoted at its upper end about a horizontal axis so as to facilitate undercutting below fence rails from the side of the fence opposite the mowing vehicle.

Still another object of my invention is to provide in a device of the class described extension means whereby the cutting of grass and weeds may be accomplished at controlled, variable distances from the mowing vehicle.

Still another object of my invention is to provide in a mowing attachment means for quickly and easily attaching and removing the same from a tractor having a side cutter bar.

These and other objects and advantages of my invention will become apparent from the following specification and claims, references being had to the accompanying drawings wherein:

FIGURE 1 is a rear elevation of a mower attachment attached to the side cutter bar of a tractor mower and partially extended.

FIGURE 2 is a fragmentary side elevation of a mower attachment attached to the side cutter bar of a tractor mower.

FIGURE 3 is a fragmentary perspective view of a mower attachment, generally from the upper front, showing attachment thereof to the side cutter bar of a tractor mower.

FIGURE 4 is an enlarged fragmentary view in vertical section of a bracket taken substantially on the line 4—4 of FIGURE 2.

Referring now more particularly to the drawings, a main arm 12 is formed from an elongated, hollow metal beam preferably rectangular in cross section. A cylindrical sleeve 14 is rigidly attached to the underside of main arm 12 as by welding. Another cylindrical sleeve 16, of identical internal diameter, is rigidly attached to a plate 18 in a similar manner. Three guards (not shown) are removed from the raisable side cutter bar 20 of a tractor mower and plate 18 attached thereto by bolts 22 passing through plate 18 and bar 20 utilizing the bolt holes (not shown) exposed in bar 20 by removal of the three guards. A pin 24 is inserted through sleeves 14 and 16, thereby joining them. Pin 24 is retained within sleeves 14 and 16 by a cotter pin or other convenient means (not shown).

A pair of extension brackets 26 and 28 are each rigidly attached, as by welding, to main arm 12 at and in extension of the end thereof nearest the tractor mower. The upper end of a support rod 30 is connected to extension arm 28 by a bolt 32. The lower end of support rod 30 is attached to bar 20 by a bolt 34 near the point of attachment of bar 20 to the tractor mower substantially below plate 18. Bar 20, support 30, and main arm 12 then form a rigid triangular structure as will be readily apparent from FIGURE 3.

A chain 36 is connected at one end to bolt 32, attached at its other end to a member of the tractor mower, to provide additional support for main arm 12.

An extension arm 38, consisting of an elongated metal bar preferably hollow and rectangular in cross-section, is slideably embraced within main arm 12.

A bracket 40 consisting of a top plate 42 and side plates 44 and 46 is welded to the top and sides, respectively, of extension arm 38 at the outer end thereof. A vertical arm 48, consisting of a metal beam preferably hollow and rectangular in cross section, is pivotally attached to bracket 40 by a bolt 50 passing through said arm near the upper end thereof and through said plates near the center thereof.

A spring retaining bracket 52, in the shape of an inverted U, is welded at its base 54 to the bottom of extension arm 38 near the outer end thereof. A pair of apertures are drilled in arms 56 and 58, respectively, to receive a rod 60 which is threaded at its ends. A pair of elongated slots 62 and 64 are formed in vertical arm 48 so as to similarly receive rod 60 and to permit vertical arm 48 to pivot freely about bolt 50 within bracket 52. A pair of compression springs 66 and 68 surround rod 60 within bracket 52 and are retained by bracket arms 56 and 58, respectively, and vertical arm 48. Threaded rod 60 is retained by a pair of nuts 70 and 72 threaded, respectively, on the ends thereof. A stop bar 74 is welded between plates 44 and 46 near the edges thereof distant from the tractor mower so as to limit the outward swing of vertical arm 48 about bolt 50.

A hydraulic actuator 76 is attached by brackets 78 and 80 to main arm 12 and to top plate 42, respectively, so as to provide means for extending and retracting extension arm 38 and bracket 40 with respect to main arm 12.

A bearing sleeve 82 is attached to vertical arm 48 near the lower end thereof and disposed with the long axis thereof parallel to the long axis of vertical arm 48, to accommodate a vertical shaft 84 which is secured at its upper end to a universal joint 86 and at its lower end to a rotary cutter bar 88. Rotary cutter bar 88 bears a pair of pivotable cutting blades 90 and 92 at the outer ends thereof. A circular guard 94 is rotatably mounted at its midpoint upon shaft 84 between sleeve 82 and rotary cutter bar 88, coaxially with rotary cutter bar 88 and separated therefrom by a washer 96.

The shaft 98 of a hydraulic motor 100, mounted on vertical arm 48, is connected to a universal joint 102 which, in turn, is connected by a shaft 104 to universal joint 86 so as to rotate rotary cutter bar 88.

Hydraulic actuator 76 and hydraulic motor 100 are powered by a hydraulic pump (not shown), such as that conventionally used to raise and lower the side cutter bar of a tractor mower, the pump being powered in turn by the engine of said vehicle. Conventional hydraulic control mechanism (not shown), mounted upon the tractor mower, may be employed to selectively control the flow of hydraulic fluid through a pair of hydraulic hose lines 106 and 108 attached to hydraulic actuator 76 and another pair of hydraulic hose lines 110 and 112 attached to hydraulic motor 100, to operate same.

In operation, three conventional cutter guards (not shown) are removed from the side cutter bar 20 of a standard tractor mower bearing a side cutter bar, and plate 18 bolted upon side cutter bar 20 through the bolt openings therein (not shown) exposed by removal of the cutter guards. The mower attachment is then attached to the side cutter bar by insertion of pin 24 through sleeves 14 and 16 and bolting the lower end of support rod 30 to the cutter bar by bolt 34. A cotter pin or other removable retaining means (not shown) retains pin 24 within sleeves 14 and 16. Chain 36 is tautly fastened at its lower end to the tractor mower so as to provide additional support for the mower attachment.

The operator by energizing hydraulic motor 100 permits same to transmit rotary force through shaft 98, universal joint 102, shaft 104, universal joint 86, and shaft 84, to rotary cutter bar 88, the blades of which, 90 and 92, then rotate to cut grass or weeds. Rotary cutter bar 88 may be retained at the desired height above the ground by raising or lowering the side cutter bar of the tractor mower, thereby raising or lowering the mower attachment including rotary cutter bar 88 to any desired elevation for cutting grass or weeds.

When encountering an obstacle, such as a fence post 114, circular guard 94 pivots vertical arm 48 and rotary cutter bar 88 about bolt 50, inward or outward as the case may be, with respect to the tractor mower, so as to protect blades 90 and 92, while simultaneously permitting same to cut grass and weeds immediately adjoining such obstacle. Circular guard 94 is free to rotate upon shaft 84 so as to facilitate circumnavigation of the obstacle and minimize strain upon bolt 50, bracket 40, extension arm 38, and other parts.

The operator, by actuating hydraulic actuator 76, may extend or retract extension arm 38 and hence vertical arm 48 and rotary cutter bar 88 so as to place rotary cutter bar 88 under horizontal barriers, such as a rail 116 attached to fence post 114, to cut grass and weeds growing thereunder. The mower attachment may cut grass and weeds beneath such horizontal barriers from either side thereof.

In practice it has been found convenient for a tractor mower utilizing this invention to cut grass and weeds along and underneath a guard fence adjoining a roadway by allowing the tractor mower to remain upon a course parallel to and immediately adjacent to the surfaced roadway, on the shoulder thereof, making a first cut of the grass and weeds along and underneath a guard fence adjoining the roadway by retaining the vertical arm on the side of the guard fence nearest the tractor mower and the roadway; upon completion of the cutting of this first swathe, and with the tractor mower remaining on the firm shoulder of the roadway, the extension arm is then extended so that vertical arm 48 and rotary cutter bar 88 are moved to the side of the guard fence distant from the tractor mower and roadway, as best shown in FIGURE 1, and, by backing up the tractor mower, cutting weeds and grass under and adjoining the guard fence from and on the reverse side thereof. This permits grass and weeds to be cut underneath and on both sides of a roadside guard fence without the necessity of driving the tractor mower itself upon the land adjoining the guard fence on the side thereof distant from the roadway. In many situations the terrain on the side of the guard fence distant from the roadway is so muddy, or of such configuration, or contains such obstacles that it will not permit the passage of a tractor mower.

Should the operator desire to move vertical arm 48 and rotary cutter bar 88 from one side of the guard fence to the other so as to cut grass or weeds there situated, he may, while the tractor mower is situated next to the guard fence, raise vertical arm 48 and rotary cutter bar 88 above the level of horizontal rail 116 by elevating the mower attachment, and hence rotary cutter bar 88, by utilizing the conventional elevating mechanism and controls of the tractor mower to raise the side cutter bar, simultaneously extending or retracting extension arm 38 and hence vertical arm 48 and rotary cutter bar 88 as desired while the same are in an elevated position. The mower attachment may then be lowered on the other side of the guard fence until rotary cutter bar 88 is at the desired distance from the ground by lowering the side cutter bar by the conventional lowering mechanism and controls of the tractor mower. The mower attachment may be easily carried by the tractor mower in transit from the garage to the worksite, it having been found most convenient to retract the extension arm and raise the side cutter bar to its maximum elevation while so doing.

In view of the foregoing description taken in conjunction with the accompanying drawings, it is believed that a clear understanding of the construction, operation, and advantages of the invention will be quite apparent to those skilled in the art.

It is to be understood, however, that even though there is herein shown and described a preferred embodiment of the invention, various changes may be made without departing from the spirit and full intendment of the invention.

What is claimed is:

1. In combination with a tractor having a bar pivotally connected thereto and extending outwardly therefrom, the improvement comprising, a main arm adapted to be rigidly attached to said bar, a support rod connected at one end thereof to the inner end of said arm and at the other end thereof to said bar at a point intermediate the points at which said bar is conected to said tractor and to said arm, respectively, to form a rigid structure, an extension arm connected to said main arm, means for extending and retracting said extension arm with respect to said main arm, a vertical arm connected to said extension arm near the outer end thereof by pivot means and depending below said extension arm, rotary cutting means connected to said vertical arm and disposed below the lower end thereof, and means for rotating said cutting means, said pivot means being arranged to permit said vertical arm and cutting means to swing toward said tractor and away from said tractor within a vertical plane and about said pivot means, a circular guard of greater diameter than said cutting means, mounted coaxially with and above said cutting means, and capable of rotation independent of said cutting means, to cause said vertical arm and cutting means to swing about said pivot means within a vertical plane normal to said pivot axis when said guard encounters an obstacle to movement thereof normal to said plane.

2. In combination with a tractor having a bar connected thereto and disposable outwardly therefrom, the improvement comprising, a main arm connected to said bar at a point intermediate the ends of said arm, a support rod connected at one end thereof to the inner end of said arm and at the other end thereof to said bar at a point intermediate the points at which said bar is connected to said tractor and to said arm, respectively, to form a rigid structure, an extension arm slidably connected to and supported by said main arm and arranged to be extended and retracted with respect thereto, means for extending and retracting said extension arm with respect to said main arm, a vertical arm connected at its upper end by pivot means to the outer end of said extension arm and depending therefrom, rotary cutting means rotatably supported by said vertical arm and disposed below the lower end thereof, and means for rotating said cutting means, the pivot axis of said pivot means being disposed horizontally and transverse to the longitudinal axes of said extension arm and vertical arm, respectively, to permit said vertical arm and cutting means to pivot about said pivot axis, toward and away from said tractor, within a vertical plane and independently of said bar, a circular guard of greater diameter than said cutting means, mounted coaxially with and above said cutting means, and capable of rotation independent of said cutting means, to cause said vertical arm and cutting means to swing about said pivot means within a vertical plane normal to said pivot axis when said guard encounters an obstacle to movement thereof normal to said plane.

3. The device of claim 2 including means yieldingly urging said vertical arm to depend at a right angle from said extension arm.

4. In combination with a tractor having a raisable bar connected thereto and disposable outwardly therefrom, a main arm, a first sleeve attached to said main arm transverse to the longitudinal axis of said main arm and intermediate its ends, a plate attached to said bar, a second sleeve attached to said plate and arranged transverse to the longitudinal axis of said bar, a pin releasably retaining said sleeves in adjoining, coaxial relationship, means for retaining said pin, a support rod connected near its lower end to said bar at a point substantially below said plate and connected near its upper end to said main arm at a point near the inner end of said main arm, to form a rigid structure, an extension arm slidably embraced by and coaxial with said main arm, means for extending and retracting said extension arm with respect to said main arm, a vertical arm, rotary cutting means rotatably supported by said vertical arm and disposed below the lower end thereof, means for rotating said cutting means, and a horizontally disposed bolt extending transversely through said extension arm near the outer end thereof and transversely through said vertical arm near the upper end thereof to form a pivotal connection between said extension arm and vertical arm, to permit said vertical arm and rotary cutting means to depend from said extension arm and to swing within a vertical plane normal to the longitudinal axis of said bolt, a circular guard of greater diameter than said cutting means, mounted coaxially with and above said cutting means, and capable of rotation independent of said cutting means, to cause said vertical arm and cutting means to swing about said pivot means within a vertical plane normal to said pivot axis when said guard encounters an obstacle to movement thereof normal to said plane.

5. In combination with a tractor having a raisable bar pivotally connected thereto and disposable outwardly therefrom, a main arm, a first sleeve attached to said main arm intermediate the ends of said main arm and transverse to the longitudinal thereof, a plate attached to said bar, a second sleeve attached to said plate and arranged transverse to the longitudinal axis of said bar, a pin releasably retaining said sleeves in adjoining coaxial relationship, means for retaining said pin, a support rod connected near its lower end to said bar at a point substantially below said plate and connected near its upper end to said main arm at a point near the inner end of said main arm, to form a rigid structure, an extension arm having a horizontal aperture therethrough near the outer end thereof and transverse to the longitudinal axis thereof, said extension arm being slideably embraced and coaxial with said main arm, means for extending and retracting said extension arm with respect to said main arm, a vertical arm having a horizontal aperture therethrough near the upper end thereof and transverse to the longitudinal axis thereof, a bolt extending horizontally through said apertures in said extension arm and vertical arm, respectively, to form a pivotal connection therebetween to permit said vertical arm to depend from said extension arm and to be swingable about said bolt and within a vertical plane normal to the longitudinal axis of said bolt, said vertical arm further having a second aperture extending therethrough in spaced, parallel relationship to said first aperture in said vertical arm and transverse to the lonigtudinal axes of said vertical arm and bolt, respectively, an inverted U-shaped bracket, having an aperture in each ar mthereof, connected to said extension arm, a rod extending through said apertures in the arms of said bracket and through said second aperture in said vertical arm, means for retaining said rod, a pair of compression springs surrounding said rod, each said spring, respectively, arranged intermediate said vertical arm and one of said arms of said bracket, to yieldingly urge said vertical arm to depend at a right angle from said extension arm, a stop bar attached to said bracket to limit the swing of said vertical arm about said bolt in one direction, rotary cutting means rotatably supported by said vertical arm and arranged below the lower end thereof, means for rotating said cutting means, and a circular guard of greater diameter than said cutting means, mounted coaxially with and above said cutting means, and capable of rotation independently of said cutting means, to rotate and cause said vertical arm and cutting means to swing about said bolt within a vertical plane normal to the longitudinal axis of said bolt when said guard encounters an obstacle to movement thereof normal to said plane.

References Cited in the file of this patent

UNITED STATES PATENTS

| | | |
|---|---|---|
| 2,411,623 | Jaques | Nov. 26, 1946 |
| 2,494,271 | Turner et al. | Jan. 10, 1950 |
| 2,669,084 | Warren | Feb. 16, 1954 |
| 2,851,842 | Harp | Sept. 16, 1958 |
| 3,003,299 | Smith et al. | Oct. 10, 1961 |